(No Model.) 2 Sheets—Sheet 1.
C. C. BERCK.
BICYCLE MOTOR ATTACHMENT.
No. 597,255. Patented Jan. 11, 1898.
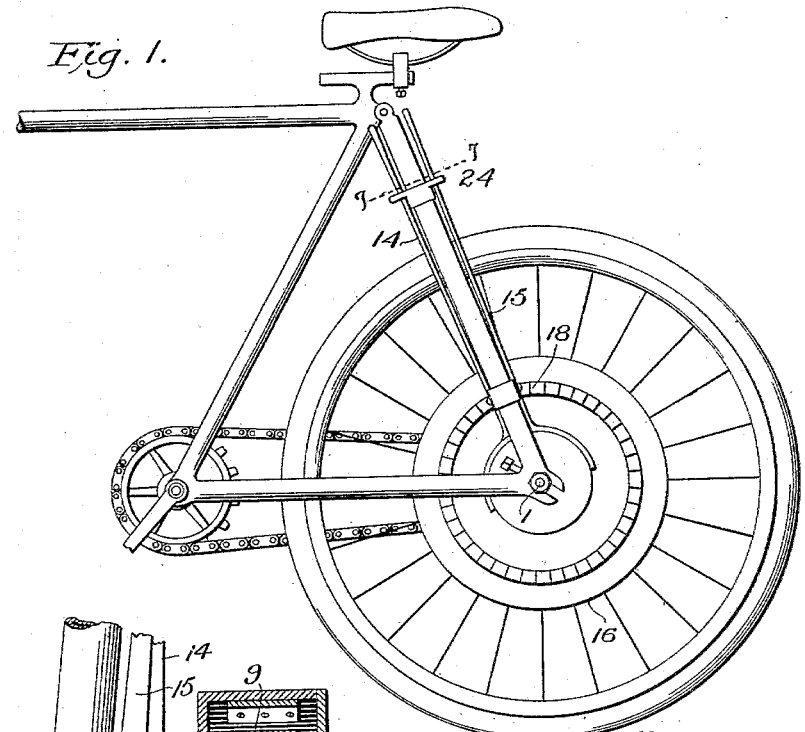
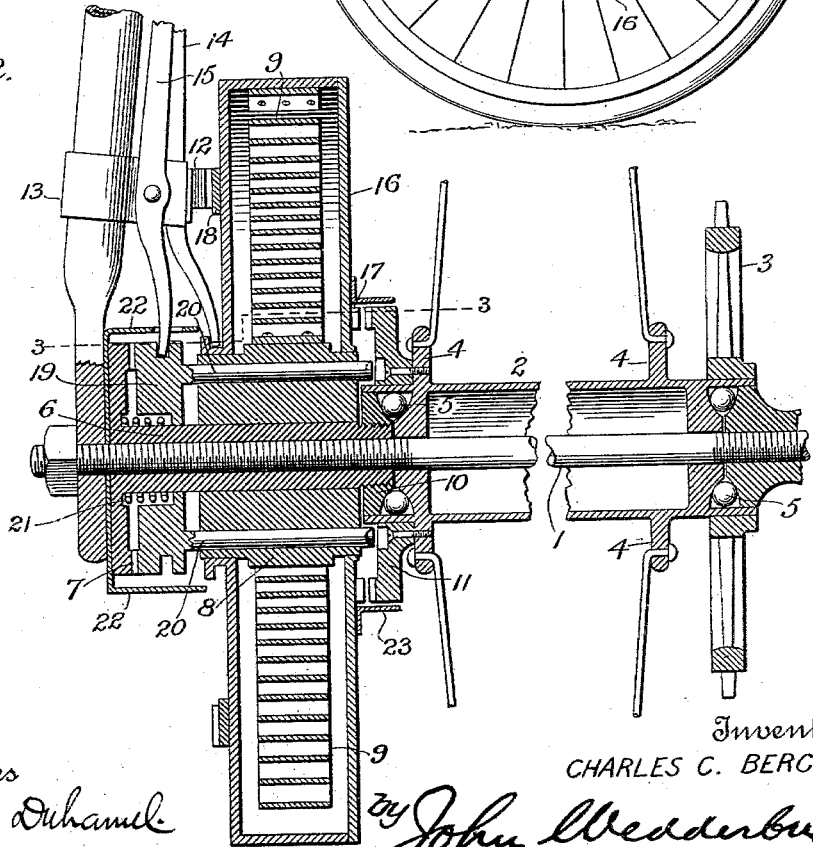
Witnesses
James F. Duhamel
Victor J. Evans
Inventor
CHARLES C. BERCK,
by John Wedderburn
Attorney (No Model.) 2 Sheets—Sheet 2.

C. C. BERCK.
BICYCLE MOTOR ATTACHMENT.

No. 597,255. Patented Jan. 11, 1898.

Witnesses
James F. Duhamel
Victor J. Evans

Inventor,
CHARLES C. BERCK,
by John Wedderburn
Attorney

UNITED STATES PATENT OFFICE.

CHARLES C. BERCK, OF BOELUS, NEBRASKA.

BICYCLE MOTOR ATTACHMENT.

SPECIFICATION forming part of Letters Patent No. 597,255, dated January 11, 1898.

Application filed August 6, 1897. Serial No. 647,351. (No model.)

*To all whom it may concern:*

Be it known that I, CHARLES C. BERCK, of Boelus, in the county of Howard and State of Nebraska, have invented certain new and useful Improvements in Bicycle Motor Attachments; and I do hereby declare the following to be a full, clear, and exact description of the invention, such as will enable others skilled in the art to which it appertains to make and use the same.

This invention relates to bicycle motor attachments.

The object of the invention is to provide a spring-motor attachment for bicycles which may be wound up when going downhill, thereby serving as a brake or resistance to prevent the wheel from running away, the energy thus stored up in the spring constituting a motor to assist in driving the bicycle uphill—that is to say, the spring is wound up in descending a hill and at the same time acts as a brake, and when wound up it may be held until a hill is reached or where a hard pull is required, when the spring is thrown into gear to help the rider climb the hill, or it may be thrown into gear to automatically propel the bicycle at any time. In this way a rider may climb or descend relatively steep hills very easily, the power necessary to be exerted by the rider being nearly constant for level and uphill. The spring is arranged between the fork or arch of the frame and the wheel and is inclosed in a neat case.

Figure 3:
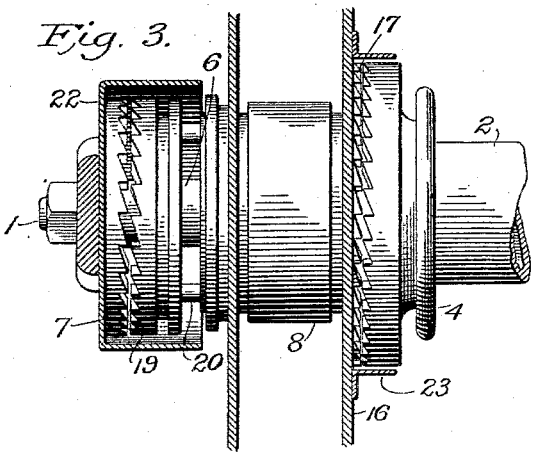
Figure 4:
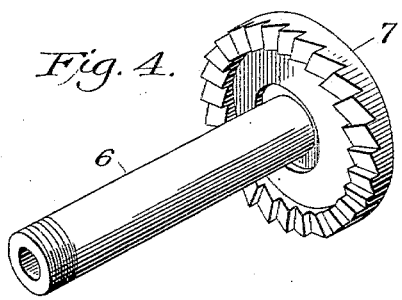
Figure 5:
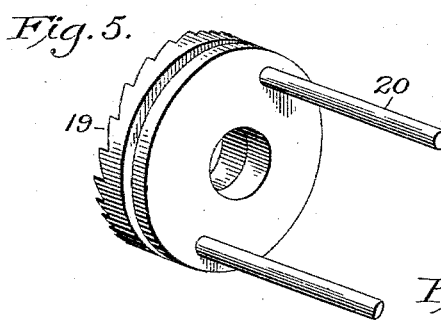
Figure 6:
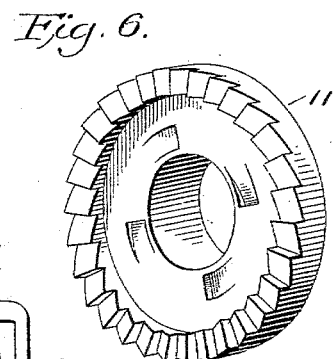
Figure 7:
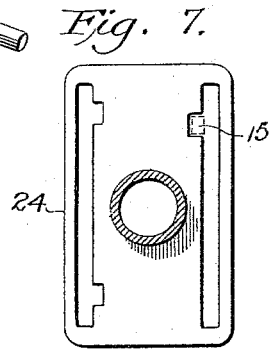

In the drawings forming part of this specification, Figure 1 is a side elevation of the rear wheel and rear part of the frame of a bicycle with my improvement connected therewith. Fig. 2 is a section through the spring-motor and its connections, showing the axle in elevation. Fig. 3 is a horizontal section on the line 3 3 of Fig. 2. Fig. 4 is a perspective showing the tube and its toothed collar by itself. Fig. 5 is a perspective of the key-piece. Fig. 6 is also a perspective of the double clutch-disk. Fig. 7 is a section on the line 7 7 of Fig. 1, showing the notched block for locking the levers.

1 is the axle or shaft upon which the driving-wheel turns.

2 is the hub of the wheel; 3, the sprocket-wheel; 4 4, the spoke-flanges, and 5 5 the ball-bearings ordinarily embraced in a modern bicycle.

6 is a tube carrying a toothed collar 7, the tube being screwed or firmly fixed to the axle 1.

8 is a spring-hub loosely mounted upon the sleeve 6 and having a band-spring 9 wound upon it. The hub 8 is loosely mounted upon the sleeve 6, so as to turn and slide freely thereon. After the hub 8 has been adjusted upon the tube 6 a collar or channeled ring 10 is screwed onto said tube, and when the tube is screwed onto the axle said ring or collar forms a part of the ball-race for the ball-bearing, as shown.

11 is a wheel or disk provided with teeth and forming one member or part of a clutch. This disk or ring is firmly secured to the spoke-disk 4 by means of screws or rivets.

12 is also a toothed or serrated clutch member formed upon and carried by a bracket 13, secured to the arch of the machine. The bracket also carries shifting levers 14 and 15.

16 is a spring-case, which should be about one-fourth the diameter of the bicycle-wheel. This case is loosely mounted upon the spring hub or drum and has a lateral movement thereon. On one side of the spring-case 16 there is attached or secured a toothed segment 17, which forms one member of a clutch and is intended to interlock at certain times with clutch member 11, fixed to the spoke-flange 4, and on the opposite side is a serrated clutch member 18 for interlocking with the member 12, connected with the bracket 13, attached to the arch of the frame.

19 is a grooved collar loosely mounted on the tube 6, said collar having teeth or serrations on its outer face to interlock with the toothed collar 7. From the inner side of this grooved collar project arms or projections 20, which for convenience I call "keys" and which extend through and beyond the spring-hub 8. These keys terminate in beveled ends adapted to interlock with one of the clutch parts of disk 11. The collar 19 is normally held out of contact with toothed collar 7 by means of a spring 21, arranged within a counterbore in collar 19 and between it and toothed collar 7.

22 is a cap or casing for inclosing the outer clutch to keep out the dirt from the groove of the collar 19. This casing is provided with slots and notches through which and opposite which the levers 14 15 may be vibrated, so that lever 15 may throw the grooved collar 19, with its keys 20, outward against the action of spring 21, and lever 14 operates to throw the spring-case either to the right to interlock with the clutch member 11 or to the left to interlock with clutch member 12.

23 is another case or band which incloses the gearing of clutch mechanism on the side next to the wheel.

It is observed that the wheel or disk 11 is provided with two sets of teeth or notches, one for interlocking with the segment 17 and the other for interlocking with the keys 20. One end of the spring 9 is secured to the hub 8, and the other end of the spring is attached to the inside of spring-case 16, and when the parts are in normal position and out of operation they are in position as shown in section in Fig. 2 of the drawings, the collar 19 and the spring-case 16 being held and maintained in such position by means of the levers 14 and 15.

24 is a plate or segment clamped to the frame or seat. This plate preferably has two slots with notches, in one of which the lever 14 is guided and locked to hold the spring-case in one position, the other guiding and locking the lever 15, which holds the clutch member 17 in mesh or gear with clutch member 11 of the bicycle-wheel. When the lever 14 is in engagement with the other notch at the other extremity of the slot, the spring-case is held with its clutch member 18 in mesh or gear with stationary clutch member 12. Only one notch is needed for lever 15, because it is only required to be locked in one direction, the spring 21 throwing it and collar 19 in the other direction. The levers 14 and 15 move laterally or crosswise of the machine. The levers are made of spring-steel to readily spring into the notches and be locked therein. The bracket carrying the segment or clutch member 12 is adjustable upon the brace-rod of the bicycle-frame, so that it may be raised or lowered in case it becomes necessary to move the axle of the driving-wheel to tighten the chain.

Normally and when the machine is driven entirely by the pedals the parts of my attachment are in the position shown. When the rider arrives at the top of a hill and starts to descend, the lever 14 is shifted to interlock the clutch members 11 and 17. The lever 15 is thrown into its notch and the collars 19 and 7 interlock to hold the drum 8. The turning of the driving-wheel thereby revolves the spring-case upon the hub or drum 8 and winds up the spring. When the spring has been wound up and it is desired to store or hold the power of the spring, the lever 14 is shifted into its proper notch in the plate 24, throwing the clutch members 18 and 12 into gear and preventing the spring-case 16 from turning on its hub. When it is desired to use the power or force of the motor, the lever 14 is moved, and simultaneously the lever 15 is released, when the collar 19, with the keys 20, is driven to the right by the spring 21, the keys thereby interlocking with the internal clutch-teeth of disk 11 and by reason of the tension of the motor-spring applying power through the disk 11 to the wheel-hub to drive or turn the wheel on the axle, and thus either drive the bicycle or assist in driving it, as the case may be. When the spring has become exhausted, the clutch between the disk 11 and the keys 20, by reason of their incline, will permit the wheel to continue its motion without straining or injuring the spring, the keys 20 and collar 19 being readily pressed laterally, by means of the incline, against the force of the spring 21.

Having thus described the invention, what I claim as new, and desire to secure by Letters Patent, is—

1. A spring-motor for bicycles, for the purpose set forth, comprising an extended axle for the driving-wheel, a drum loosely mounted thereon, a casing loosely mounted upon the drum and adapted to have a lateral movement thereon, a spring attached at its ends to the drum and casing and inclosed within the latter, clutch members fixed on opposite sides of the casing, a clutch member carried by the driving-wheel to engage one of the aforesaid clutch members, and a clutch member carried by the frame of the bicycle to engage the other clutch member on the casing; together with means for connecting the drum alternately to the hub and axle of the driving-wheel, a lever operating said means, and a lever engaging the spring-casing for shifting the same, substantially as shown and described.

2. A spring-motor for bicycles, for the purpose set forth, comprising an extended axle for the driving-wheel, a drum loosely mounted thereon, a casing loosely mounted on the drum and having a lateral movement thereon, a spring attached at its ends to the drum and casing and inclosed within the latter, clutch members fixed on opposite sides of the casing, a clutch member carried by the driving-wheel to engage one of the aforesaid clutch members, and a clutch member or segment on the frame of the bicycle to engage the other clutch member of the casing; together with a clutch member fixed on the extended end of the axle, a sliding clutch member engaging therewith and carrying key-rods which extend through openings therefor in the drum, a clutch member on the driving-wheel with which said key-rods are adapted to engage, and independent operating-levers engaging the sliding clutch member and casing, substantially as shown and described.

3. A spring-motor for bicycles, comprising an extended axle for the driving-wheel, a sleeve fixed thereon and having an integral clutch member at its outer end, a drum loosely mounted on the sleeve, a casing loosely mounted on the drum and having a lateral movement thereon, a spring attached at its ends to the drum and casing, said spring being inclosed within the latter, clutch members secured on opposite sides of the casing, a clutch member carried by the driving-wheel to engage one of the aforesaid clutch members, and a clutch member or segment on the frame of the bicycle to engage the other clutch member of the casing; a sliding clutch member on the sleeve of the axle, key-rods projecting from said sliding clutch member through openings therefor in the drum, the ends of said key-rods being beveled, a clutch member on the driving-wheel with which said key-rods engage, and a spring acting upon the sliding clutch member to normally cause such engagement, the opposite movement of the sliding clutch member engaging the clutch member formed on the sleeve; together with independent levers connected to the spring-casing and sliding clutch member, and a plate having notches for holding the levers in an adjusted position, as shown and described.

In testimony whereof I have signed this specification in the presence of two subscribing witnesses.

CHARLES C. BERCK.

Witnesses:
WILLIAM ERICKSEN,
PETER JENSEN.